United States Patent [19]
Van Dam et al.

[11] Patent Number: 5,838,844
[45] Date of Patent: Nov. 17, 1998

[54] INTEGRATED OPTICAL CIRCUIT COMPRISING A POLARIZATION CONVERTOR

[75] Inventors: Cornelis Van Dam, Zoetermeer, Netherlands; Helmut Heidrich; Karl M. Hamacher, both of Berlin, Germany; Cornelis A. M. Steenbergen; Meint K. Smit, both of Delft, Netherlands; Carl M. Weinert, Berlin, Germany

[73] Assignee: U.S. Philips Corporation, New York, N.Y.

[21] Appl. No.: 715,693

[22] Filed: Sep. 18, 1996

[30] Foreign Application Priority Data

Sep. 20, 1995 [EP] European Pat. Off. .............. 95202541
Nov. 2, 1995 [EP] European Pat. Off. .............. 95202957

[51] Int. Cl.⁶ .................................................. G02B 6/126
[52] U.S. Cl. ............................................... 385/14; 385/11
[58] Field of Search ................................... 385/11, 14, 15

[56] References Cited

U.S. PATENT DOCUMENTS 4,793,678  12/1988  Matsumoto et al. ...................... 385/11
5,185,828   2/1993  Van Der Tol ............................. 385/28
5,341,444   8/1994  Henry et al. ............................. 385/11

FOREIGN PATENT DOCUMENTS

0565308A1  10/1993  European Pat. Off. .......... G02B 6/12
WO9522070   8/1995  WIPO .............................. G02B 6/34

OTHER PUBLICATIONS

"Polarization–Insensitive Arrayed–Waveguide Grating Wavelength Multiplexer On Silicon", by H. Takahashi et al, Optics Letters, Apr. 1, 1992, vol. 17, No. 7, pp. 499–501.

*Primary Examiner*—John D. Lee
*Assistant Examiner*—Ellen E. Kang
*Attorney, Agent, or Firm*—Steven R. Biren

[57] ABSTRACT

An integrated optical circuit includes a first device and a second device, which devices are connected by a polarization convertor. The polarization convertor includes a curved section of a waveguide, integrated in the optical circuit. The curved section may have several differently curved subsections. The conversion ratio is determined in part by the radius of curvature of the curved subsections as well as by the number of transitions between subsections.

15 Claims, 3 Drawing Sheets

INTEGRATED OPTICAL CIRCUIT COMPRISING A POLARIZATION CONVERTOR

BACKGROUND OF THE INVENTION

The invention relates to an integrated optical circuit comprising a first device having an output for emitting radiation with a first state of polarization, a second device having an input for receiving radiation with a second, different state of polarization, and a polarization convertor connected between the output and the input.

The polarization convertor converts radiation having a first state of polarization into radiation having a second, different state of polarization. For example, it can convert radiation guided in a TE mode into radiation guided in a TM mode or vice versa. The TE (transverse electric) mode is a mode in which $E_y$ is the dominant electric component and the TM (transverse magnetic) mode is a mode in which $H_y$ is the dominant magnetic component of the electromagnetic field of the radiation. The y-axis is an axis in the plane of the slab-type substrate of the circuit and perpendicular to the direction of propagation of the radiation along the z-axis. The conversion ratio is the ratio of the amount of radiation in one mode which is converted to radiation in the other mode. A conversion ratio of one converts one mode completely into the other mode.

A circuit as described in the opening paragraph is known from American U.S. Pat. No. 5,185,828, disclosing an optical input section for a coherent optical receiver operating on the basis of polarization diversity. The first device is a local radiation source, emitting TE polarized radiation. The polarization convertor changes the state of polarization to 50% TE and 50% TM polarized radiation. The second device comprises a mixer for combining the converted local oscillator radiation with signal radiation, and a detection circuit. The polarization convertor comprises a straight waveguide having a geometric structure consisting of a periodic sequence of waveguide sections with different widths. Drawbacks of the polarization convertor are that its length is relatively large, of the order of millimeters, and that it has a small bandwidth due to its length.

SUMMARY OF THE INVENTION

It is an object of the invention to provide an integrated optical circuit comprising a relatively small polarization convertor having a large bandwidth.

The object is met by a circuit as described in the opening paragraph, which circuit is characterized according to the invention in that the polarization convertor comprises a curved section of an integrated waveguide. The polarization conversion ratio of the curved section depends on the materials and the geometry of the waveguide. Since a curved waveguide can be made relatively short, the convertor can be made small, resulting in a large bandwidth.

The conversion originates at locations in the waveguide where the radius or the location of the center of curvature changes, in other words, at transitions between differently curved sections. Hence, the conversion ratio increases with an increasing number of transitions in the curved section. In cases where the conversion ratio of a convertor comprising one section having one curvature is not sufficient, the waveguide section may comprise several concatenated subsections of differently and oppositely curved and/or straight parts of the waveguide, each transition between subsections increasing the conversion ratio of the convertor. The curved subsections may be connected by straight waveguide subsections. A large number of subsections reduces the bandwidth of the convertor. A curved subsection may form an angle of 90°, and pairs of succeeding oppositely curved 90° subsections may be used for easy connection to devices of the circuit. The subsections may also be arranged to form an S shape or a U shape. A series of subsections is preferably arranged to form a meander line, thereby reducing the space in the circuit occupied by the polarization convertor and making it possible to have the input and output of the convertor in line. The angle formed by a subsection may also be smaller or larger than 90°.

The conversion ratio of the convertor can also be increased by decreasing the radius of curvature of the curved subsections. The radii of curvature are preferably smaller than 100 μm, because in this range the conversion ratio is relatively large for most types of integrated optical circuits, for example those made of III–V compounds such as InP and GaAs.

The width of the waveguide in the curved section is preferably between approximately 0.85 and 1.15 times the wavelength of the radiation in order to achieve a large conversion ratio.

When the minimum radius of curvature of the curved section is in the range from 5 to 15 μm above the cut-off radius of the waveguide, the conversion ratio of the convertor is both large and relatively insensitive to manufacturing tolerances in the width of the waveguide. The cut-off radius is defined as the radius where a 90° curve has a radiation loss of one dB.

A curved subsection causes a shift of the centre of the intensity distribution of the guided radiation from the centre of the waveguide in a radial direction away from the centre of curvature. The form of the curved subsections must be such that the guidance of the radiation is maintained. The optimum form depends on the material of the waveguide structure. A curved section comprising several successive subsections is preferably designed in such a way that the intensity distributions in both subsections meeting at a transition substantially coincide. This means that the overlap of the cross-section of the intensity of the guided radiation in one subsection and that in the following subsection is maximized at the location of the transition between the two subsections. As a result, the centre-line of the waveguide may show stepwise displacements at the transitions.

A strongly curved waveguide subsection may show radiative losses of the guided radiation. The losses may be reduced substantially when according to the invention the curved section of the waveguide has a deep etched waveguide structure or a selective area grown waveguide structure.

The curved section or part of it may have an adiabatically increasing curvature according to the invention. A curvature is said to increase adiabatically when the radius of curvature decreases so gradually that it does not, in principle, give rise to radiative losses and that no polarization conversion takes place in the curved section. The desired polarization conversion according to the invention originates at a transition between the section with adiabatically increasing or decreasing curvature and a waveguide with a different curvature. A curved section with an adiabatically increasing curvature has the advantage that it has a low loss for the guided radiation.

In a special embodiment of the circuit according to the invention the polarization convertor functions as a lambda-over-two plate. Such a convertor is especially suitable for use in circuits where the guiding of radiation through a waveguide is polarization dependent. The convertor should preferably be arranged at a symmetric location in the waveguide, such that the polarization dependencies of the waveguide on both sides of the convertor are equal.

The polarization convertor can be used advantageously in a phased-array circuit. When a polarization convertor functioning as a lambda-over-two plate is arranged in the middle of each waveguide of the phased array, the performance of the phased array will be polarization independent. A first embodiment of the phased-array circuit is a multiplexer, typically having several inputs and a single output. A second embodiment is a demultiplexer, having one input and several outputs. A third embodiment is a router, having several inputs and an equal number of outputs. When a router is provided with switches or adjustable phase shifters, each input can be routed to selected outputs.

It is remarked that a polarization-independent phased-array multiplexer is known from an article by Takahashi et al, published in Optics Letters, 1992, volume 17, no. 7 page 499 to 501. The phased array is made polarization independent by inserting a lambda-over-two quartz plate half-way the waveguides of the array. However, such a multiplexer cannot be integrated on a single substrate. It requires two substrates with the quartz plate in between, thereby generating additional radiation losses in the transitions between the substrates and the quartz plate.

Another advantageous embodiment of the circuit according to the invention is a Mach-Zehnder interferometer switch wherein the switching is realized by electro-optic phase shifters. Since the electro-optic effect is different for TE and TM polarized radiation, the operation of a known interferometer switch will be polarization dependent. According to the invention each of the shifters in the arms of the interferometer comprises a polarization convertor in the form of a curved section of a waveguide. The polarization conversion of the curved waveguide cancels the polarisation dependence of the shifters, making the switch polarization independent.

The gain of a semiconductor amplifier is in general dependent on the polarization of the radiation to be amplified. A polarization-independent optical amplifier circuit is obtained, when the first and second device in the circuit according to the invention are a first and second semiconductor laser amplifier, the output of the first amplifier being connected to the input of the second amplifier by the polarization convertor. The convertor rotates the plane of polarization preferably over 90°. As a result, radiation which passed the first amplifier in the TE mode, passes the second amplifier in the TM mode and vice versa. When the amplifiers have similar properties, the gain of the amplifier circuit as a whole will be independent of the state of polarization of the input radiation.

An alternative embodiment of a polarization-independent optical amplifier circuit according to the invention comprises a polarizing beamsplitter and a semiconductor laser amplifier, the polarization convertor being connected between an output waveguide of the beamsplitter and an input waveguide of the laser amplifier, and an output of the laser amplifier being connected to a further output waveguide of the beamsplitter.

BRIEF DESCRIPTION OF THE DRAWING

The invention will now be described by way of example and with reference to the accompanying drawings, in which.

DESCRIPTION OF THE PREFERRED EMBODIMENTS

Figure 1:
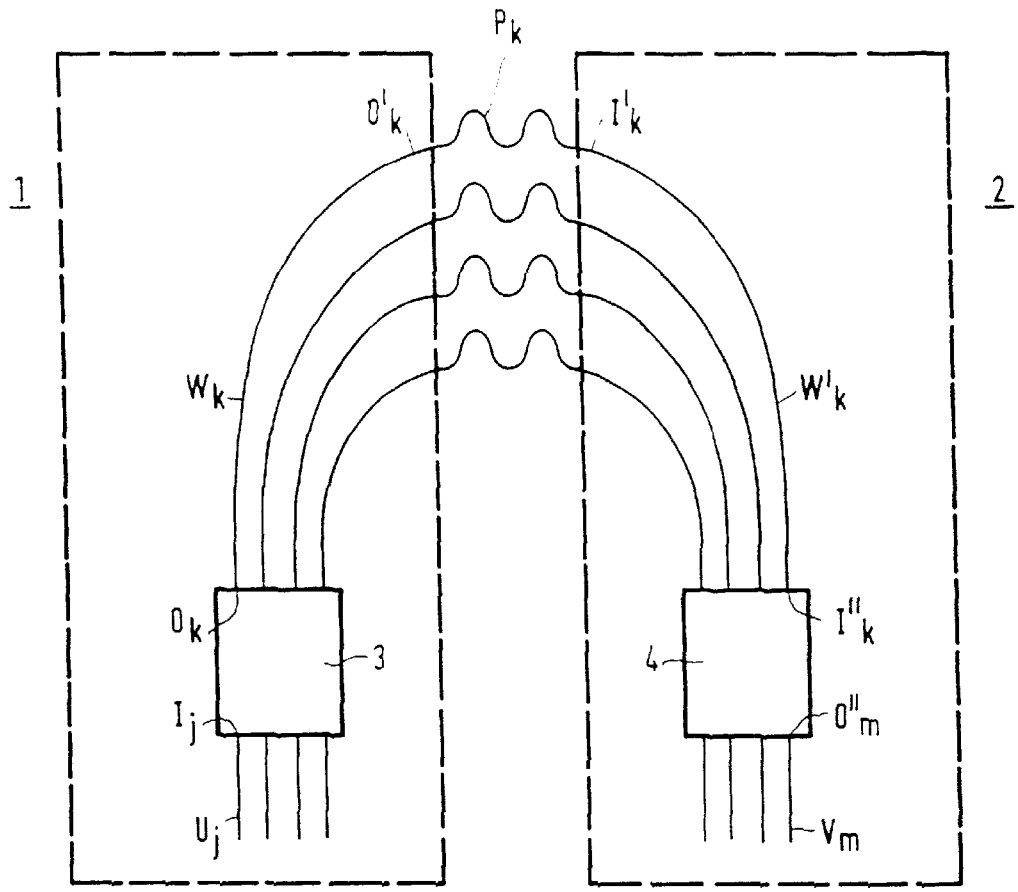
FIG. 1 shows a phased-array (de)multiplexer according to the invention.

FIG. 1 shows an integrated polarization-insensitive phased-array circuit according to the invention, which can be arranged as multiplexer, demultiplexer or router. Such a circuit is particularly useful in the field of optical communications. A multiplexer can be used to increase the transmission capacity of optical fibres by adding closely spaced wavelength bands. A demultiplexer can be used to perform the operation opposite to that of a multiplexer, i.e. decomposing an incoming signal into its constituent wavelength bands.

The circuit shown in FIG. 1 comprises two devices 1 and 2 integrated on a single slab-type substrate. The first device 1 has an optical coupler 3, operating as a splitter, for connecting four inputs $I_j$ (j=1, 2, 3, 4) to four outputs $O_k$ (k=1, 2, 3, 4). An input waveguide $U_j$ is connected to each input $I_j$. Each output $O_k$ is connected to one end of a waveguide $W_k$. A waveguide is a selectively formed region of optical material for propagating optical energy therein. Device 1 has outputs $O'_k$, each of which is connected to the other end of waveguide $W_k$ (k=1, 2, 3, 4). The second device 2 has an optical coupler 4, operating as a combiner, for connecting four inputs $I''_k$ (k=1, 2, 3, 4) to four outputs $O''_m$ (m=1, 2, 3, 4). Device 2 has four inputs $I'_k$, each of which is connected to one end of a waveguide $W'_k$. The other end of waveguide $W'_k$ is connected to the related input $I''_k$. Each output $O''_m$ is connected to a waveguide $V_m$. The couplers may be radiative couplers as known from inter alia European patent application no. 0 565 308 or multi-mode interference (MMI) couplers as known from international patent application WO 95/22070 (PHN 15 175). The plurality of waveguides $W_k$ and $W'_k$ form together the phased-array of the multiplexer.

Each output $O'_k$ of device 1 is connected to the corresponding input $I'_k$ of device 2 by means of a polarization convertor $P_k$ (k=1, 2, 3, 4). Each polarization convertor comprises a waveguide in the form of a meander line with a double U-bend, each bend having a radius of curvature of 50 μm and the convertor having an overall length of about 500 μm. The small size of the convertor can be used advantageously in miniaturizing optical circuits. The size of the polarization convertors is so small, that they can easily be integrated in the phased array. The radius of curvature and the corresponding beatlength are chosen such that the polarization convertor operates as a lambda-over-two plate, changing an incoming TE polarization to an outgoing TM polarization and an incoming TM polarization to an outgoing TE polarization. Thus TE polarized radiation at $O_k$ will travel through waveguide $W_k$ of the phased array as TE wave and through waveguide $W'_k$ of the phased array as TM wave, whereas TM polarized radiation at $O_k$ will travel through waveguide $W_k$ as TM wave and through waveguide $W'_k$ as TE wave. When the waveguides are birefringent, the velocities of propagation of TE and TM polarized radiation will be different. In the phased array according to the invention, incoming radiation always travels half of its path with the velocity of a TE wave and half with the velocity of TM wave. As a result the total travel time of radiation through the two waveguides $W_k$ and $W'_k$ is independent of the state of polarization of the radiation at output $O_k$.

Although FIG. 1 shows a circuit with four input waveguides $U_j$ and four output waveguides $V_m$, it is also possible to have a single input waveguide and a plurality of output waveguides, the circuit forming a wavelength demultiplexer. A circuit with a plurality of input waveguides and one output waveguide can be used as a multiplexer, whereas a circuit with one input waveguide and one output waveguide can be used as a comb filter.

Figure 2A:
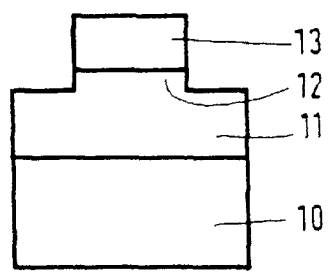
FIG. 2A shows a cross-section of a waveguide of the phased array of FIG. 1.
Figure 2B:
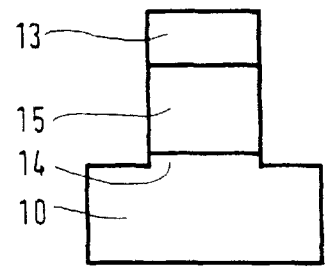
FIG. 2B shows a cross-section of a waveguide of the polarization convertor of FIG. 1.

FIG. 2A shows a cross-section of a waveguide $W_k$ of the circuit shown in FIG. 1. On a substrate 10 of InP a quaternary InGaAsP guiding layer 11 is grown with a thickness of 0.5 µm outside a rib 12 and a thickness of 0.6 µm inside the rib. A layer 13 of 0.3 µm thick and 1.4 µm wide InP is grown on top of rib 12. FIG. 2B shows a cross-section of a curved section of the waveguide in one of the polarization converters $P_k$. The cross-section is similar to the cross-section shown in FIG. 2A, with the difference that a single additional manufacturing step has been applied to the circuit in the form of locally deep etching. The same structure is obtainable by selective area growth. As a result, the substrate 10 has the profile of a rib 14 and the quaternary layer 15 has the width of the rib over its entire height. The two waveguides shown in FIGS. 2A and 2B can be easily made on a single substrate, the waveguide of FIG. 2B requiring only a single additional etching step or a single epitaxy mask, respectively.

Figure 3:
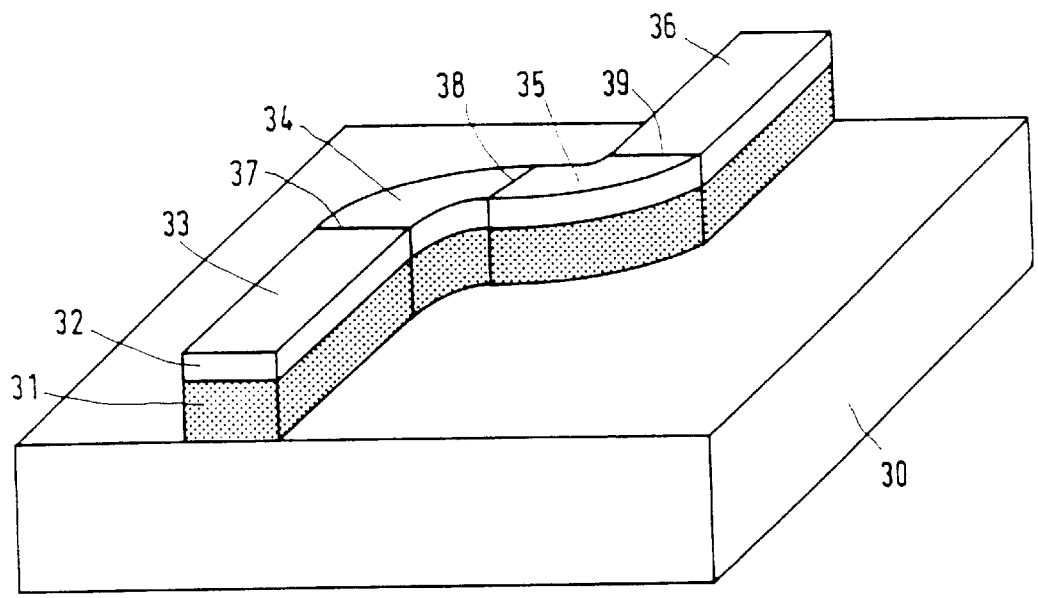
FIG. 3 shows a polarization convertor having two curved subsections.

FIG. 3 shows a curved section of a waveguide for use as a polarization convertor. An InP substrate 30 is provided with a waveguide comprising a quaternary layer 31 of InGaAsP having a thickness of 600 nm and a top layer 32 of InP with a thickness of 300 nm; the width of quaternary layer 31 and top layer 32 is equal. The waveguide is made of material with a gap wavelength of 1.3 µm and designed for radiation with a wavelength of 1.508 µm. The waveguide has in succession a straight subsection 33, two curved subsections 34 and 35, each forming an angle of 90°, and another straight subsection 36. The polarization transformations occur at the transitions 37, 38 and 39 between the subsections 33; 34, 35, and 35, 36. The transformation is strongest at transition 38 between the two oppositely curved subsections.

Figure 4:
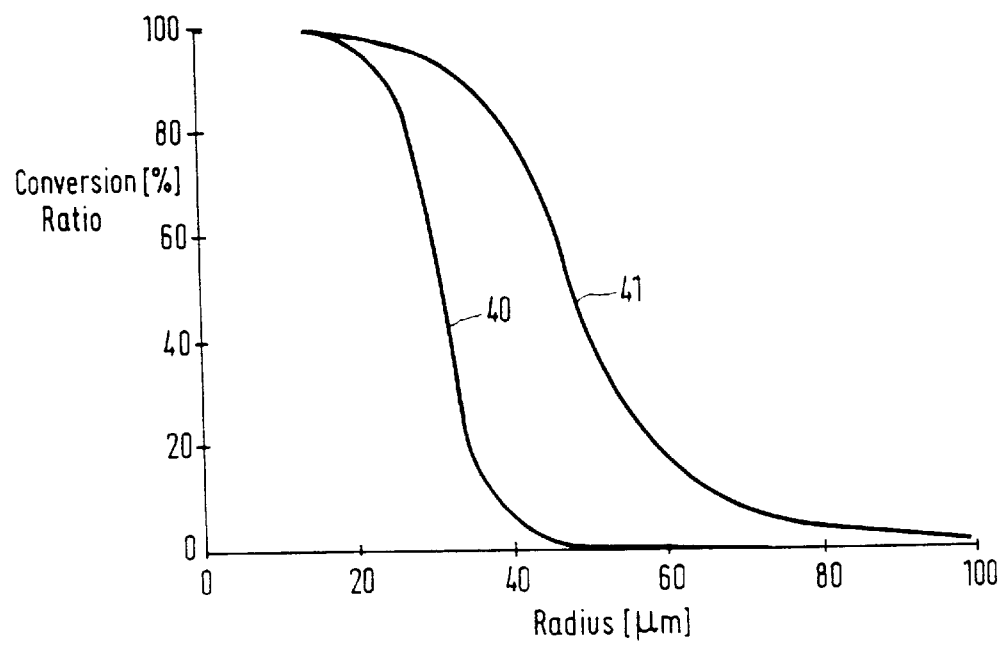
FIG. 4 shows the polarization conversion ratio for a single discontinuity of the convertor of FIG. 3.

FIG. 4 shows the calculated conversion ratio at transition 37 from straight waveguide subsection 33 to curved waveguide subsection 34 as a function of the radius of curvature of subsection 34. Curves 40 and 41 give the conversion ratio for a curved waveguide having a width of the quaternary layer 31 of 1.6 µm and 1.4 µm respectively. The efficiency of the conversion is apparent from the Figure. A conversion ratio of 0.5 (50%) is already achieved in a transition from a straight waveguide subsection to a subsection with a radius of 30 µm for a 1.6 µm wide waveguide. The beatlength between orthogonal modes of TE polarization and TM polarization is of the order of 5 mm or more for a conversion ratio larger than 0.5, making the conversion approximately independent of the length of the relatively short curved subsections. The radiation losses for waveguides having a radius of about 20 µm have been measured to be in the order of 0.1 to 0.2 dB for a 90° curve. The radius of 20 µm is above the cut-off radius for this specific waveguide structure, below which radius the modes will be strongly attenuated.

FIG. 4 also shows that the conversion ratio depends on the width of the waveguide. The 1.6 µm wide bend shows a substantial conversion for radii below 50 µm, as indicated by curve 40, whereas the 1.4 µm wide bend already shows a substantial conversion below 100 µm, as indicated by curve 41. The width should be chosen in the range from 0.85 to 1.15 times the wavelength of the radiation guided in the curved section. For a wavelength of 1.508 µm the radius should thus be in a range from 1.3 µm to 1.7 µm in order to obtain a relatively large conversion. The above calculations have been confirmed by measurements on curved waveguides.

FIG. 4 demonstrates that the curves for different widths come close together for radii approaching the cut-off radius. The cut-off radius of the waveguide shown in FIG. 3 is approximately 10 µm. The cut-off radius may be determined experimentally or by numerical simulation for a specific waveguide structure. For radii between 5 and 15 µm above the cut-off radius the conversion ratio is relatively insensitive to the width of the waveguide, which is advantageous for the manufacturing tolerances of the curved section. Moreover, in this range a conversion ratio of almost 100% is achieved and radiative losses are low. The radius of curvature of the curved section shown in FIG. 3 is thus preferably in a range between 15 µm and 25 µm.

Figure 5:
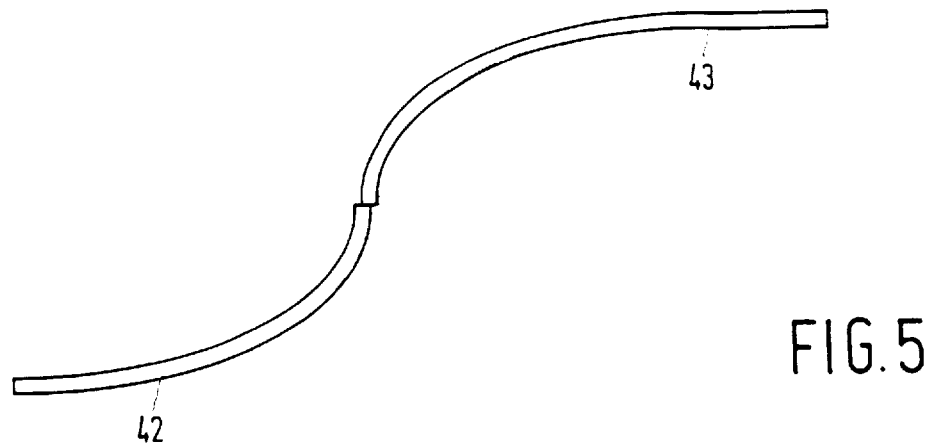
FIG. 5 shows a convertor having a conversion ratio of one.
Figure 6:
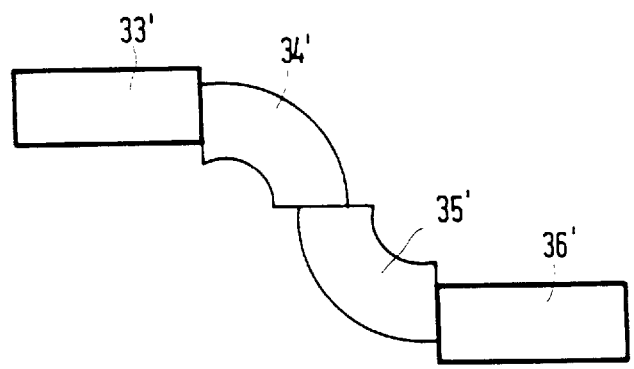
FIG. 6 shows a convertor with laterally displaced subsections.

FIG. 5 shows a single-transition TE-TM convertor suitable for use in the S-band and having strongly curved subsections 42 and 43. In strongly curved waveguides the non-dominant field component ($E_x$ for TE, $E_y$ for TM polarization) tends to increase with decreasing radius of curvature. For a certain radius the dominant and non-dominant component become substantially equal in amplitude and profile. For this specific radius the E field is rotated by 45°. This holds for both the TE and TM polarized mode. In this degenerate case the modes have a strongly hybrid polarization, and the labels TE and TM refer to the corresponding polarization before the polarization convertor. When such a degenerate waveguide is connected to a similar waveguide having the opposite curvature, as shown in the Figure, full conversion from one mode into the other mode will occur. The convertor may be formed by adiabatically increasing the curvature of subsection 42 along the length of the waveguide from zero up to the degeneracy value, then changing the curvature at the transition to subsection 43 and adiabatically reducing the curvature back to a straight waveguide. The two subsections may be laterally displaced at the transition, as explained in the next paragraph.

Figure 7:
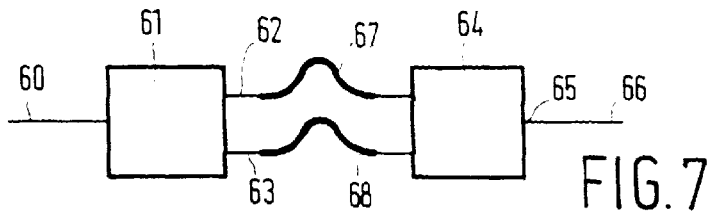
FIG. 7 shows a Mach-Zehnder interferometer switch according to the invention.

In the embodiment of the invention shown in FIG. 3 each straight or curved waveguide subsection is connected to another curved or straight subsection in such a way that the centre-line of waveguide is a continuous line. However, the centre-line may also show a stepwise, lateral displacement at the transition of two subsections in order to match radiation profiles of the subsections, thereby reducing radiative losses and maximizing the conversion at the transition. FIG. 7 shows a convertor according to the invention having two curved subsections 34' and 35' between two straight subsections 33' and 36'. The centre-line of each subsection has been displaced laterally in the direction of its point of curvature.

FIG. 7 shows a Mach-Zehnder interferometer switch according to the invention. An input waveguide 60 is connected to a first coupler 61, operating as a splitter, having two waveguides 62 and 63 connected to its outputs. The waveguides are connected to a second coupler 64, operating as a combiner, having an output 65 with a waveguide 66 connected to it. Waveguides 62 and 63 form the arms of the interferometer. Part of the waveguides 62 and 63 is overlaid with electrodes 67 and 68 respectively, indicated in the drawing by two thick lines. The electrodes make it possible to change the propagation velocity of the modes in each waveguide electrically. Different electro-optical physical effects can be used to change the refractive indices of the waveguide material, for example carrier injection, carrier depletion, band-filling effect, Pockels effect or Kerr effect. The electrodes and the part of the waveguides beneath them operate as phase shifters, adapting the phases of the radiation guided in the interferometer arms to the phases required at the entrance of second coupler 64 in order to obtain constructive or destructive interference at output 65.

The sections of waveguides 62 and 63 beneath the electrodes 67 and 68 respectively are curved according to the invention. Since the electro-optical effects are different for TE and TM polarizations, a switch without the curved waveguide sections would be polarization dependent. In the switch according to the invention the curved sections operate as polarization convertors, making the operation of the switch polarization independent. In an alternative embodiment the phase shifter and the polarization convertor do not coincide but, instead, the polarization convertor is arranged between two phase shifters.

Figure 8:
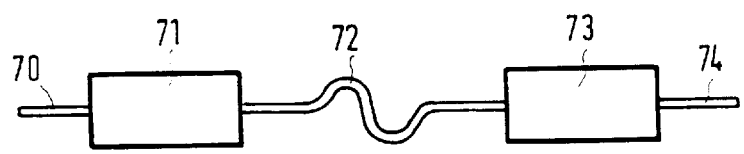
FIGS. 8 and 9 show two polarization-independent optical amplifier circuits according to the invention.

FIG. 8 shows a polarization-independent optical amplifier circuit according to the invention. An input waveguide 70 is connected to a first optical amplifier. When the amplifier is of a semiconductor type, it will in general heave a gain dependent on the polarization of the incoming radiation. This dependence can be overcome by passing the output radiation of amplifier 71 subsequently through a polarization convertor 72 and a second optical amplifier 73 to an output waveguide 74. The convertor rotates the state of polarization of the radiation emitted by amplifier 71 over 90°. Amplifier 73 has a gain with substantially the same polarization-dependence as amplifier 71. The optical amplifier circuit comprising elements 70 to 74 has a gain which is substantially independent of the polarization of the incoming radiation. Polarization convertor 72 preferably comprises a curved section according to the invention, allowing integration of the two amplifiers and the convertor in a single integrated optical circuit.

Figure 9:
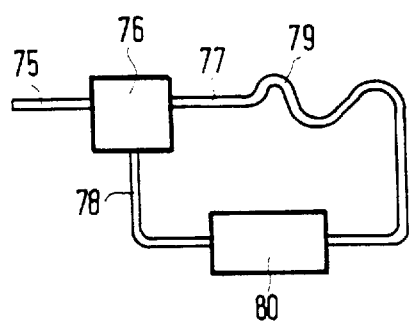

FIG. 9 shows an alternative embodiment of a polarization-independent optical amplifier circuit according to the invention comprising only one optical amplifier. A waveguide 75 is connected to a polarizing beamsplitter 76, transmitting incoming radiation of one polarization, e.g. the TE polarization, to its output waveguide 77 and incoming radiation of another polarization, e.g. the TM polarization, to its output waveguide 78. Waveguides 77 and 78 are connected by means of a polarization convertor 79 and an optical amplifier 80. The TE-polarized radiation in waveguide 77 is converted to TM-polarized radiation by the convertor. Amplifier 80 amplifies the TM-polarized radiation, which is routed to waveguide 75 through beamsplitter 76. The TM-polarized radiation in waveguide 78 travelling towards amplifier 80 is amplified, converted to TE-polarized radiation by convertor 79, and subsequently routed to waveguide 75 via beamsplitter 76. Since only TM-polarized radiation passes through amplifier 80, the gain of the total optical amplifier circuit comprising elements 75 to 80 is independent of the state of polarization of the incoming radiation. Polarization converter 79 preferably comprises a curved section according to the invention, allowing intergration of the amplifier, convertor and beamsplitter in a single integrated optical circuit.

We claim:

1. Integrated optical circuit comprising a first device having an output for emitting radiation with a first state of polarization, a second device having an input for receiving radiation with a second, different state of polarization, and a polarization converter connected between the output and the input, characterized in that the polarization convertor comprises a curved section of an integrated waveguide integrally formed with said first and second devices on a single substrate.

2. Integrated optical circuit as claimed in claim 1, characterized in that the curved section comprises two or more successive subsections, each subsection comprising a differently curved part of the waveguide.

3. Integrated optical circuit as claimed in claim 2, characterized in that the subsections are aligned so that at a transition between successive subsections the overlap of radiation profiles in the successive subsections is maximized.

4. Integrated optical circuit as claimed in claim 2, characterized in that the subsections form a meander line.

5. Integrated optical circuit as claimed in claim 1, characterized in that the minimum radius of curvature of the curved section is less than 100 $\mu$m.

6. Integrated optical circuit as claimed in claim 1, characterized in that the curved section comprises a waveguide having a width between 0.85 and 1.15 times the wavelength of the radiation.

7. Integrated optical circuit as claimed in claim 1, characterized in that the minimum radius of curvature of the curved section is in the range from 5 $\mu$m to 15 $\mu$m above the cut-off radius of the waveguide.

8. Integrated optical circuit as claimed in claim 1, characterized in that the curved section is a deep etched waveguide structure.

9. Integrated optical circuit as claimed in claim 1, characterized in that the curved structure is a selective area grown waveguide structure.

10. Integrated optical circuit as claimed in claim 1, characterized in that at least part of the curved section has an adiabatically increasing curvature.

11. Integrated optical circuit as claimed in claim 1, characterized in that the polarization convertor functions as a lambda over two plate.

12. Integrated optical circuit as claimed in claim 1, characterized in that the first and second device together form an integrated phased-array circuit, the first device comprising a splitter having a plurality of outputs and first waveguides connected to the outputs, the second device comprising a plurality of second waveguides and a combiner having a plurality of inputs, the second waveguides being connected to the inputs, and in that the polarization convertor connects one of the first waveguides with one of the second waveguides.

13. Integrated optical circuit as claimed in claim 1, characterized in that the first and second device together form an integrated Mach-Zehnder interferometer switch, the first device comprising a splitter having a plurality of outputs and first waveguides connected to the outputs, the second device comprising a plurality of second waveguides and a combiner having a plurality of inputs, the second waveguides being connected to the inputs, and in that the polarization convertor is combined with an electro-optic switch connecting one of the first waveguides with one of the second waveguides.

14. Integrated optical circuit as claimed in claim 1, characterized in that the first and second device are a first and second semiconductor laser amplifier, respectively, the circuit forming a polarization independent optical amplifier.

15. Integrated optical circuit according to claim 1, characterized in that the first device comprises a polarizing beamsplitter and the second device comprises a semiconductor laser amplifier, in which the polarization convertor is connected between an output waveguide of the beamsplitter and an input waveguide of the laser amplifier, and an output of the laser amplifier is connected to a further output waveguide of the beamsplitter.

* * * * *